Oct. 25, 1966　　　B. J. LIPPS, JR　　　3,281,329
FERMENTATION PROCESS FOR PRODUCING A HETEROPOLYSACCHARIDE
Filed Sept. 10, 1963　　　2 Sheets-Sheet 1

Benjamin J. Lipps Jr.
INVENTOR.

Benjamin J. Lipps Jr.
INVENTOR.

BY James E. Reed
ATTORNEY

United States Patent Office 3,281,329
Patented Oct. 25, 1966

3,281,329
FERMENTATION PROCESS FOR PRODUCING A HETEROPOLYSACCHARIDE
Benjamin J. Lipps, Jr., Connersville, Ind., assignor, by mesne assignments, to Esso Production Research Company, Houston, Tex., a corporation of Delaware
Filed Sept. 10, 1963, Ser. No. 307,997
7 Claims. (Cl. 195—31)

The present invention relates to industrial fermentation and is particularly concerned with an improved fermentation process which permits more effective utilization of the substrate employed.

The production of heteropolysaccharides by the fermentation of carbohydrates with bacteria of the genus Xanthomonas is in certain respects typical of many industrial fermentation processes employed to produce complex chemical compounds, pharmaceuticals, foodstuffs and similar materials. The process normally used to produce the heteropolysaccharides requires the inoculation of a sterile medium containing from about 1 to about 5 weight percent of a carbohydrate with a culture containing Xanthomonas organisms, fermentation of the medium under controlled conditions for a period of from about 36 to about 72 hours, and subsequent recovery of heteropolysaccharides from a fermentate containing bacterial cells, unconverted carbohydrates, water and other constituents. Experience has shown that the concentration of the medium employed must be kept low to avoid adverse effects on metabolism of the bacteria, that the heteropolysaccharide yields are generally poor, that product quality often varies considerably from one batch to the next, and that the polymer thus produced is expensive because of the time required and the sterilization procedures necessary. Similar difficulties are encountered in other industrial fermentation processes.

The present invention provides a new and improved fermentation process that alleviates many of the difficulties which have characterized earlier processes. In accordance with the invention, it has now been found that fermentation reactions can be readily carried out by continuously depositing a film containing a suitable substrate on the surface of a rotating drum, moving belt or similar device, applying a culture containing selected microorganisms to the film, and continuously removing fermentation products produced by the microorganisms after sufficient residence time has elapsed. Tests have shown that such a process makes possible use of the substrate in higher concentrations, permits suprisingly effective utilization of the substrate, reduces the time required for carrying out the fermentation reaction, minimizes variation in product quality, and simplifies recovery of the fermentation products. Because of these and related advantages, the invention permits substantial savings in the cost of carrying out fermentation reactions.

The nature and objects of the invention can best be understood by referring to the following detailed description of a process for the production of heteropolysaccharides by the fermentation of carbohydrates with bacteria of the genus Xanthomonas and to the accompanying drawing, in which.

Figure 1:
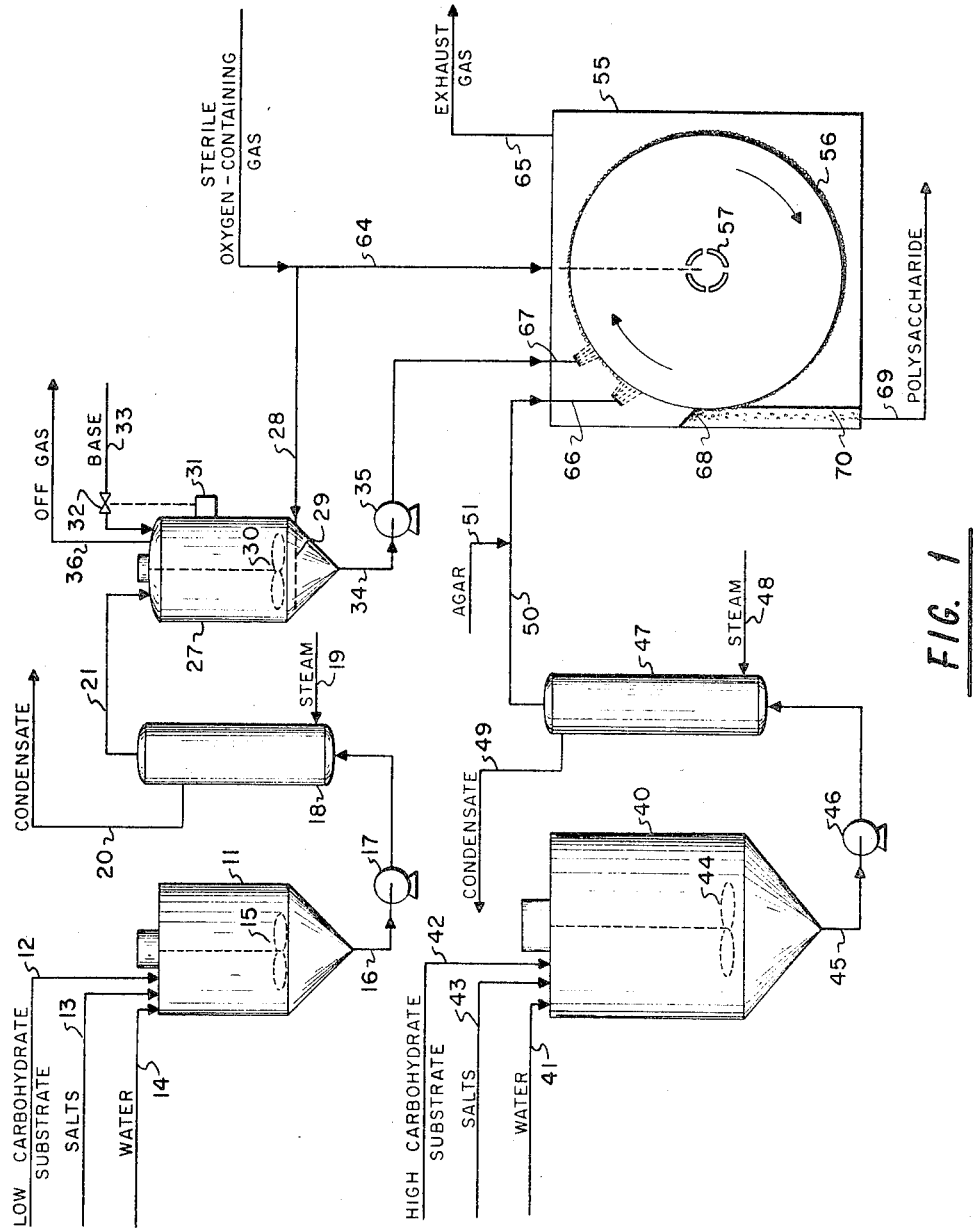
FIGURE 1 is a flow sheet schematically illustrating the process of the invention.

The plant depicted in FIGURE 1 of the drawing includes a feed preparation vessel 11 in which a low carbohydrate culture medium suitable for the growth of bacterial cells is prepared. The substrate employed in the medium is introduced into the vessel through line 12 from a source not shown. The substrate utilized may comprise boullion stock, blood serum, yeast extract, meat peptone, malt extract, milk peptone, soy peptone, distiller's solubles or a similar material having a relatively high protein content and a relatively low carbohydrate content. Numerous substrates composed primarily of protein hydrolysis products are marketed commercially for use in culture media and will therefore be familiar to those skilled in the art. Salts such as dipotassium acid phosphate, sodium carbonate, and magnesium sulfate, if used in the medium and not already present in the substrate, may be added through line 13. Experience has shown that many substrates, particularly those marketed commercially for use in culture media, contain all the constituents required for satisfactory metabolism of the bacteria and that the addition of salts with the substrate is therefore unnecessary. Water utilized in preparing the culture medium may be added to the system through line 14.

The constituents employed in preparing the culture medium are mixed in preparation vessel 11 by means of an agitator 15. The finished medium will normally contain protein hydrolysis products or a similar substrate in a concentration within the range between about 0.1% and about 10% by weight and will ordinarily include less than about 0.5% by weight of carbohydrate. Dipotassium acid phosphate, magnesium sulfate and other salts, if used, will generally be employed in concentrations between about 0.1 and about 0.5% by weight. The most effective concentration for a particular fermentation will depend to some extent upon the particular constituents used in the medium, the fermentation condition employed, and the particular strain of bacteria with which the fermentation is carried out. These concentrations may therefore be varied considerably. Specific formulations on which bacteria of the genus Xanthomonas may be grown satisfactorily include the following: (1) soy peptone—0.7% by weight, magnesium sulfate—0.2% by weight, and glucose—0.2% by weight; (2) Basamin-Busch (a commercial culture material marketed by Anheuser-Busch, Inc., St. Louis, Missouri)—0.5% by weight, magnesium sulfate—0.2% by weight, and glucose—0.2% by weight; and (3) malt extract—0.3% by weight, yeast extract—0.3% by weight, meat peptone—0.4% by weight, magnesium sulfate—0.2% by weight and glucose—0.2% by weight. The percentages given in the above formulations are all based upon the water used in the medium. Other formulations of similar composition which may be employed for purposes of the invention will readily suggest themselves to those skilled in the art.

The low carbohydrate fermentation medium thus prepared in vessel 11 is pumped continuously through line 16 by means of pump 17 to a sterilization unit 18. The sterilization unit employed may comprise a heat exchanger, a jacketed vessel, a vat provided with an electrical heater, or similar apparatus within which the medium can be heated to a temperature within the range between about 200° F. and about 275° F. and held at that temperature for a period of from about 2 to about 5 minutes. Higher temperatures and longer residence times may be utilized if found necessary to render the medium sterile but in general the temperature and time indicated will be sufficient to kill any bacteria or spores present. The sterilization unit shown in the drawing comprises a heat exchanger into which steam is introduced through line 19 and from which condensate is withdrawn through line 20.

The sterile medium produced as described above is withdrawn from the sterilization unit at a temperature between about 200° F. and about 275° F. and is passed through line 21 into fermentation vessel 27. In starting the process, the medium introduced initially is allowed to cool to the fermentation temperature between about 70° F. and about 100° F., preferably between about 75° F. and about 85° F. After equilibrium has been established, further cooling is generally unnecessary. The rate at which the hot medium is introduced from the sterilization unit is generally low so that only localized heating takes place and hence the overall temperature of the fermenting medium does not change appreciably. A cooling unit not shown can be installed between the sterilization unit and vessel 27 if desired, however. The unit selected may be a jacketed vessel, a vat containing cooling coils or other conventional cooling apparatus which will permit cooling of the medium without contaminating it.

The medium introduced into vessel 27 at the start of the process is inoculated with a culture containing bacteria of the genus Xanthomonas. Representative species of the genus which may be utilized include *Xanthomonas begoniae, Xanthomonas campestris, Xanthomonas carotae, Xanthomonas hederae, Xanthomonas incanae, Xanthomonas malvacearum, Xanthomonas papavericola, Xanthomonas phaseoli, Xanthomonas pisi, Xanthomonas translucens, Xanthomonas vasculorum* and *Xanthomonas vesicatoria*. Cultures of these and other xanthomonads are contained in the American Type Culture collection located in Washington, D.C. and in other repositories. Experimental work has shown that production of heteropolysaccharide by the fermentation of carbohydrates is a characteristic trait of members of the genus Xanthomonas and that any of a variety of different species can therefore be employed. It has been found, however, that certain species produce the heteropolysaccharide more efficiently than do others and are therefore preferred. *Xanthomonas begoniae, Xanthomonas campestris, Xanthomonas pisi* and *Xanthomonas vesicatoria* are outstanding in this respect.

Following initial inoculation of the medium in vessel 27, a sterile gas containing oxygen is introduced into the medium through line 28 in order to provide the aerobic conditions necessary for metabolism of the microorganisms. Either air or substantially pure oxygen may be utilized. In large-scale operations, it is frequently preferred to employ substantially pure oxygen and recycle the off-gases in order to reduce compression costs but this may be less advantageous in smaller plants. It is preferred to introduce the injected gas through a sparger or similar distribution device 29 located near the bottom of the vessel. Agitation in addition to that supplied by the gas as it bubbles upwardly through the medium may be provided by means of an agitator 30. Under the aerobic condition thus maintained in vessel 27, the bacteria contained in the medium consume the substrate and rapidly multiply. Relatively little production of heteropolysaccharide takes place because of the low carbohydrate content of the medium but some polymer will normally be formed. This is accompanied by a decrease in the pH of the medium. In order to control this and maintain conditions favorable for the production of cells at a high rate, the vessel is provided with an electrode assembly or similar pH measuring equipment indicated by reference numeral 31. This equipment continuously measures the pH of the medium and actuates a motor-driven valve 32 in line 33. Sodium hydroxide or a similar base is continuously or intermittently injected into vessel 27 in a concentration sufficient to counteract the acidity of the medium and maintain the pH at a level between about 6.0 and about 7.5, preferably between about 6.5 and about 7.2. In some cases a buffer can also be employed to control the pH of the medium but this latter system has certain disadvantages and is not generally preferred. After the initial inoculation of the medium in vessel 27 with the microorganisms, the conditions within the vessel are controlled to assure a continuous supply of medium containing the bacteria in high concentrations. Medium containing the cells thus produced is withdrawn from vessel 27 through line 34 and is circulated by means of pump 35 into the polymer-producing stage of the process. Off-gases are removed from the vessel through line 36.

A high carbohydrate medium to be fermented by the bacteria produced as described above is prepared continuously in a vat or mixing vessel 40. This vessel is provided with line 41 through which water is introduced into the system, with line 42 for the introduction of the carbohydrate to be employed as a substrate for production of the heteropolysaccharide, and with line 43 through which a bacterial nutrient and salts may be supplied if desired. A variety of carbohydrates can be fermented with the bacterial cells produced in vessel 27 to obtain the heteropolysaccharide. Suitable carbohydrates include glucose, sucrose, fructose, lactose, maltose, galactose, soluble starch, cornstarch and the like. The carbohydrate utilized need not be in a refined state and hence crude products having a high carbohydrate content, raw sugar or sugar beet juice for example, may be employed. Unrefined carbohydrates such as these are generally less expensive than the corresponding purified materials and are therefore preferred for production of the heteropolysaccharide. Distiller's solubles or similar material containing organic nitrogen and suitable trace elements may be used with the carbohydrate as a nutrient. Dipotassium acid phosphate and in some cases magnesium phosphate may also be employed in the medium. Agitator 44 is provided in vessel 40 to facilitate mixing of the ingredients from which the medium is formulated.

The addition of a nutrient and salts to the medium prepared in vessel 40 is not always essential. Experience has shown that the fermentate transferred from vessel 27 often contains sufficient nutrient and salts to permit continued growth of the bacteria and production of the heteropolysaccharide, particularly where raw sugar beet juice or similar crude carbohydrate source material is used. Many such crude materials contain organic nitrogen and trace elements in quantities sufficient for metabolism on the xanthomonads, even in the absence of nutrients and salts from a preceding stage, and hence the salts and nutrients may in some cases be omitted. The medium utilized will normally contain from about 1% to about 20% by weight of the selected carbohydrate but in some cases significantly higher carbohydrate contents may be utilized. If desired, the medium may in addition contain from about 0.01% to about 0.5% by weight of dipotassium acid phosphate and from about 0.1% to about 10% by weight of a nutrient.

The meduim thus prepared in vessel 40 is withdrawn from the vessel through line 45 and circulated by means of pump 46 into a second sterilization unit 47. This unit may be similar to that described earlier and may comprise a heat exchanger, a vessel containing an electrical heater or similar apparatus in which the medium can be heated to a temperature of from about 200° F. to about 275° F. and held at that temperature for a period of from about 2 to 5 minutes. Again higher temperatures and longer residence time than those specified may be utilized if necessary to kill specific bacteria or spores present in the medium but the times and temperatures indicated will generally be sufficient. The unit shown is a countercurrent heat exchanger into which steam or other heating fluid is introduced through line 48 and from which condensate is withdrawn through line 49. The sterile medium is withdrawn overhead from the sterilization unit at a temperature within the range between about 200° F. and about 275° F. through line 50. Agar or a similar gum or mucilaginous material may be added to the hot medium through line 51 in a concentration ranging between about 0.1% and about 2.0% in order to promote the film-forming characteristics of the medium if desired.

This use of agar is not always essential, however, and is often omitted.

The medium produced in vessel 27 and that prepared in vessel 40 are introduced separately into the polymer producing stage of the process. One embodiment of the apparatus employed in this stage is shown in greater detail in FIGURE 2 of the drawing. The apparatus depicted comprises an outer enclosure or housing 55 within which sterile conditions can be maintained. In some cases the housing may be omitted. Located within the housing is a large drum 56 supported on a horizontal axle 57 by supporting members 58. A motor and suitable gears or belts and pulleys not shown in the drawing are provided to permit slow rotation of the drum. The rotational speed employed will depend primarily upon the particular fermentation reaction to be carried out. The period of rotation should be sufficient to permit substantial completion of the reaction. For the fermentation of carbohydrates with xanthomonads as described, it has been found that high heteropolysaccharide yields can be obtained in from 8 to 24 hours. Rotational periods of from about 12 to 16 hours are preferred. Other fermentations may require lower or higher speeds.

Figure 2:
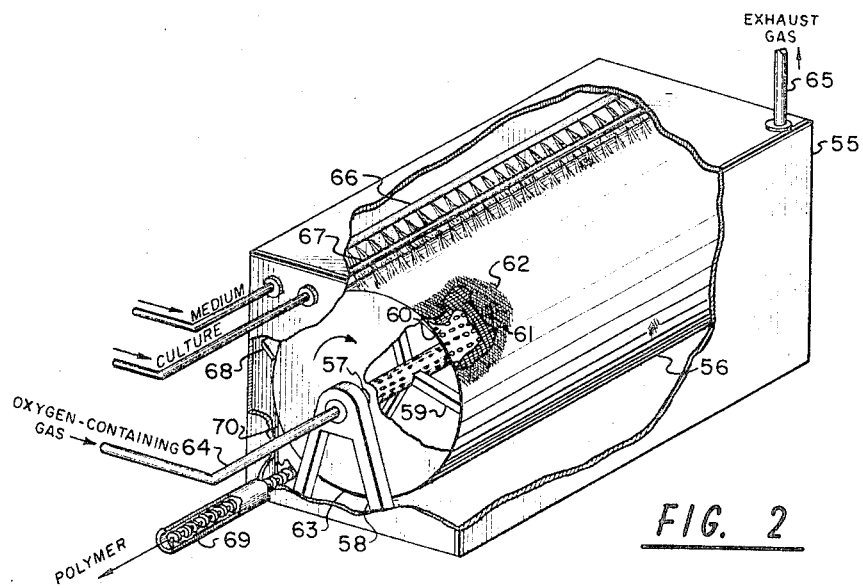
FIGURE 2 is an isometric view, partially in section, of one embodiment of apparatus useful in carrying out the process of FIGURE 1; and, FIGURE 3 is an isometric view, partially in section, of alternate apparatus which may be employed in carrying out the invention.

The drum shown in FIGURE 2 includes spokes 59 which support a perforated outer shell 60. A finely-woven fabric covering 61 is stretched over the shell and this is in turn covered by a wire mesh 62. The ends of the drum are covered by imperforate plates 63. Inside the drum, axle 57 is perforated to permit the introduction of an oxygen-containing gas through line 64. Exhaust gases passing through the drum surface are removed from the housing through line 65. Feed lines 66 and 67 containing small openings are used for spraying of the medium and culture onto the surface of the drum as shown. A doctor blade or similar device 68 is located below the feed lines to permit the removal of a thin layer of solids from the drum surface. A screw conveyor or similar means 69 is provided for the withdrawal of solids from collection pan 70 located below the doctor blade.

Fermentation of the high carbohydrate medium prepared in vessel 40 to produce the heteropolysaccharide is carried out by first spraying the hot medium through the orifices in line 66 onto the surface of the rotating drum. This results in the formation of a thin film of the medium within the opening in wire mesh 62. The agar in the medium solidifies as the film cools. As pointed out earlier, the use of agar is not essential but is generally preferred because it improves retention of the film on the drum surface and may also absorb toxic products formed during fermentation. As the drum rotates further, a culture containing bacterial cells from fermentation vessel 27, is sprayed from line 67 onto the film deposited previously. Only a small amount of this second medium is normally required and hence the culture medium may be diluted with sterile water in an intermediate dilution tank if desired. The dilution tank is not shown in the drawing. The bacteria thus deposited on the film containing the high carbohydrate substrate cause fermentation at the film surface. Oxygen is continuously injected through line 54 and axle 57 to provide the aerobic conditions necessary for metabolism of the bacteria.

The oxygen-containing gas introduced through the openings in axle 57 passes outwardly through the porous drum surface and the film, picking up carbon dioxide liberated by the bacteria. Again either air or substantially pure oxygen can be used. The exhaust gases thus produced are withdrawn from the system through line 65. These gases will normally contain xanthomonads and should generally be sterilized. This may be done by combining the gas stream in line 65 with the off-gases removed from vessel 27 through line 36 and passing the combined stream through a bacterial filter, a bactericidal solution or a combustion chamber in which a fuel is burned in the presence of the gas in order to incinerate the microorganisms. An alternate procedure is to scrub the gases to remove carbon dioxide, enrich the combined gas stream in oxygen, and then recycle the gases. The procedure employed will depend primarily upon the size of the plant. In large scale operations it is generally preferred to recycle the gas; whereas in smaller operations the burning of methane or a similar fuel in the gas stream may be more advantageous.

The carbohydrate contained in the film on the surface of drum 56 diffuses outwardly as fermentation takes place. Tests have shown that this permits use of the carbohydrate in higher concentrations than are generally feasible in a reactor and makes possible more complete carbohydrate utilization. It has been found, for example, that polymer production takes place satisfactorily on films having carbohydrate contents as high as 20%; whereas about 5% is generally the upper limit in stirred reactors. The heteropolysaccharide produced is scraped from the surface of the drum by doctor blade 68 and drops into collection pan 70. This polymer normally has an extremely high viscosity and contains much less water than that produced in conventional fermenters. In a typical operation, a viscosity in excess of about 800 centipoisies was obtained when the solids were diluted with eight parts of distilled water and tested with a Brookfield viscometer and LVT No. 2 spindle at 3 r.p.m. The heteropolysaccharide content was about 5% compared with a value of from about 1 to 3% in a conventional process. This higher viscosity and greater heteropolysaccharide content simplifies subsequent purification and drying of the product. The polymer may be removed from the collection pan by means of a screw conveyor or similar device 69. Product quality is normally uniform over long periods.

Further processing of the material produced as described above will depend upon its intended use. The product withdrawn from the collection pan generally contains bacterial cells, small amounts of agar and other contaminants in addition to the heteropolysaccharide. This material may be dried as is for use in oil field drilling fluids and other applications where high purity is not essential. In other cases it will be preferred to purify the material by dissolving it in water, filtering out the cells, and then precipitating the heteropolysaccharide. Suitable precipitating agents include aqueous solutions containing sodium chloride, potassium chloride or a similar electrolyte and an organic solvent such as methanol, ethanol or acetone; quaternary ammonium compounds; and aqueous solutions of water soluble divalent salts having pH values in excess of about 8.5, preferably above about 10. These and other purification methods have been described elsewhere and need not be set forth in detail for purposes of this invention.

Figure 3:
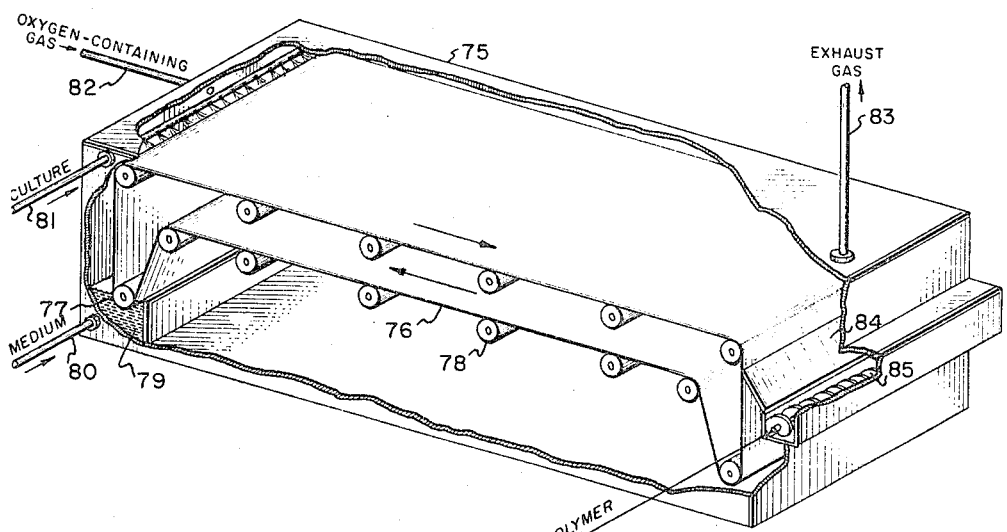

It will be apparent from the foregoing that the process described above simplifies production of the heteropolysaccharide and alleviates many of the difficulties encountered in conventional batch-type operations. The process is not limited to the use of the specific apparatus shown in FIGURE 2 of the drawing. FIGURE 3 shows an alternate form of apparatus utilizing a belt in place of a rotating drum. The apparatus of FIGURE 3 includes an outer enclosure or housing 75 within which sterile conditions are maintained. Belt 76 is mounted on rollers 77 and idlers 78 and is driven by a motor and gear system not shown. The belt moves at a rate such that the upper surface traverses the housing during a period from about 8 to about 24 hours. A tank 79 fed through line 80 is located at one end of the housing beneath a roller so that the belt passes through medium contained in the tank. A film of medium is thus continuously formed on the surface of the belt. A culture medium containing bacterial cells is introduced into the housing through line 81 and is sprayed onto the film previously formed. The bacteria ferment the substrate in the medium as the belt moves. Air or oxygen required by the microorganisms is introduced through line 82 at one end of the housing, circulated over the belt surface and discharged from the other end of the apparatus through line 83. Baffles or similar means not shown in the drawing may be installed to control the air flow if desired. The exhaust gas may again be sterilized by passing it through a bacterial filter, by bubbling it through a bactericidal solution, or by passing it through a combustion zone. The heteropolysaccharide produced by the microorganisms is scraped from the belt surface by means of doctor blade 84 and discharged into a screw conveyor or similar device 85. This material may then be dried for use in the impure state or may be purified by removing the bacterial cells and isolating the heteropolysaccharide from the remaining material.

It will be apparent that still other forms of apparatus which will permit the formation of film of medium on an exposed surface, innoculation of the film surface with selected microorganisms, and subsequent removal of the fermentation products from the surface can be used in practicing the invention. The use of concentric drums or cylinders to increase the surface area available, the use of fixed surfaces over which suitable spray devices and means for removing the film can be moved continuously, and other modifications of the equipment shown will be apparent to those skilled in the art. In like manner, it will be apparent that the process is not limited to the production of heteropolysaccharides by the action of bacteria of the genus Xanthomonas on carbohydrates and can instead be employed for carrying out other fermentation reactions, particularly reactions in which the fermentation products are closely associated with cell growth. Typical of other fermentations which can be carried out in the manner described herein are those used for the production of yeast, those employed to produce microbial cells having a high protein or fat content for use as an animal or food supplement, and those utilized to produce high molecular weight materials by the action of *Leuconostoc mesenteroides, Chromobacterium violacium, Aerobacter aerogenes, Rhizobium trifolii* and other organisms on suitable substrates. Certain of these fermentations may require minor changes in the preliminary steps used to prepare the media and may take place under anaerobic, rather than aerobic, conditions. These and similar modifications will be readily apparent to those experienced in the fermentation art.

What is claimed is:
1. A process for the production of a heteropolysaccharide which comprises the steps of continuously forming a thin film of a sterile medium having a carbohydrate content in excess of about 1% by weight at successive points on the surface of a moving member, applying a medium having a carbohydrate content less than about 0.5% by weight and containing bacteria of the genus Xanthomonas to said film on said moving member at successive points, supplying oxygen to said bacteria on said film and maintaining said film under fermentation conditions for a period sufficient for said bacteria to ferment said carbohydrate therein as said member continues to move, and continuously removing heteropolysaccharide from the surface of said moving member at successive points.

2. A process as defined by claim 1 wherein said sterile medium contains carbohydrate in a concentration of from about 1 percent to about 20 percent by weight.

3. A process as defined by claim 1 wherein said medium applied to said film contains from about 0.1% to about 10% of protein hydrolysis products by weight.

4. A process as defined by claim 1 wherein said bacteria are *Xanthomonas campestris.*

5. A process as defined by claim 1 wherein said bacteria area *Xanthomonas vesicatoria.*

6. A process as defined by claim 1 wherein said film is formed by moving said member adjacent an orifice through which said sterile medium is sprayed onto the surface of said member.

7. A process as defined by claim 1 wherein said medium containing said bacteria is applied by spraying the medium onto said film.

References Cited by the Examiner
UNITED STATES PATENTS

| | | | |
|---|---|---|---|
| 2,325,368 | 7/1943 | Christensen | 195—115 |
| 3,020,206 | 2/1962 | Patton et al. | 195—31 |
| 3,127,329 | 3/1964 | Anderson | 195—142 |
| 3,129,144 | 4/1964 | Page et al. | 195—139 |
| 3,193,460 | 7/1965 | Krabbe et al. | 195—139 X |

A. LOUIS MONACELL, *Primary Examiner.*

ALVIN E. TANENHOLTZ, *Assistant Examiner.*